(12) United States Patent
van den Bogerd et al.

(10) Patent No.: US 9,006,378 B2
(45) Date of Patent: Apr. 14, 2015

(54) COLOR STABLE THERMOPLASTIC COMPOSITION

(71) Applicant: SABIC Innovative Plastics IP B.V., Bergen op Zoom (NL)

(72) Inventors: Joshua Arie van den Bogerd, Tholen (NL); Johannes de Brouwer, Oisterwijk (NL)

(73) Assignee: SABIC Global Technologies B.V. (NL)

( * ) Notice: Subject to any disclaimer, the term of this patent is extended or adjusted under 35 U.S.C. 154(b) by 0 days.

(21) Appl. No.: 14/289,228

(22) Filed: May 28, 2014

(65) Prior Publication Data

US 2014/0357765 A1  Dec. 4, 2014

Related U.S. Application Data

(60) Provisional application No. 61/828,413, filed on May 29, 2013.

(51) Int. Cl.
| | | |
|---|---|---|
| *C08G 64/00* | (2006.01) | |
| *G02B 1/04* | (2006.01) | |
| *C08K 5/1515* | (2006.01) | |
| *C08K 5/529* | (2006.01) | |
| *C08G 63/02* | (2006.01) | |

(52) U.S. Cl.
CPC ............... *G02B 1/04* (2013.01); *C08K 5/1515* (2013.01); *C08K 5/529* (2013.01)

(58) Field of Classification Search
USPC ............. 528/196, 198; 428/32.34, 34.1, 35.7, 428/141, 143, 149, 412
See application file for complete search history.

(56) References Cited

U.S. PATENT DOCUMENTS

| | | | |
|---|---|---|---|
| 3,839,247 A | 10/1974 | Bialous et al. | |
| 4,076,686 A | 2/1978 | Calkins | |
| 5,064,885 A | 11/1991 | Muller et al. | |
| 5,288,926 A | 2/1994 | Patrascu et al. | |
| 5,364,895 A | 11/1994 | Stevenson et al. | |
| 5,424,006 A | 6/1995 | Murayama et al. | |
| 5,438,086 A | 8/1995 | Stevenson et al. | |
| 5,470,938 A | 11/1995 | Sakashita et al. | |
| 5,672,664 A | 9/1997 | Derudder et al. | |
| 5,883,218 A | 3/1999 | Gordon et al. | |
| 6,066,861 A | 5/2000 | Hohn et al. | |
| 6,069,225 A | 5/2000 | Gerace et al. | |
| 6,174,987 B1 | 1/2001 | Gordon et al. | |
| 6,613,823 B1 | 9/2003 | Battiste et al. | |
| 6,692,659 B2 | 2/2004 | Brown et al. | |
| 6,706,846 B2 | 3/2004 | Brack et al. | |
| 6,995,294 B2 | 2/2006 | Webb et al. | |
| 7,112,703 B2 | 9/2006 | Neumann et al. | |
| 7,227,046 B2 | 6/2007 | Commarieu | |
| 7,491,837 B2 | 2/2009 | Schlosberg et al. | |
| 7,879,927 B2 | 2/2011 | Vlottes et al. | |
| 7,959,827 B2 | 6/2011 | Comanzo et al. | |
| 7,964,273 B2 | 6/2011 | Kogure et al. | |
| 7,989,531 B2 | 8/2011 | Bersted et al. | |
| 2002/0147256 A1 | 10/2002 | Eckel et al. | |
| 2003/0180542 A1 | 9/2003 | Pickett et al. | |
| 2004/0227465 A1 | 11/2004 | Menkara et al. | |
| 2005/0113534 A1 | 5/2005 | Agarwal et al. | |
| 2005/0177007 A1 | 8/2005 | Neumann et al. | |
| 2005/0215833 A1 | 9/2005 | Neumann et al. | |
| 2006/0135690 A1 | 6/2006 | Juikar et al. | |
| 2006/0263547 A1 | 11/2006 | Cojocariu et al. | |
| 2007/0004941 A1 | 1/2007 | Blaschke et al. | |
| 2007/0139949 A1 | 6/2007 | Tanda et al. | |
| 2007/0299169 A1 | 12/2007 | Ohira et al. | |
| 2008/0029720 A1 | 2/2008 | Li | |
| 2008/0081855 A1 | 4/2008 | Mullen | |
| 2008/0113117 A1 | 5/2008 | Coenjarts et al. | |
| 2009/0043053 A1 | 2/2009 | Gorny et al. | |

(Continued)

FOREIGN PATENT DOCUMENTS

| | | | |
|---|---|---|---|
| CN | 101205358 A | 6/2008 | |
| CN | 101885907 A | 11/2010 | |

(Continued)

OTHER PUBLICATIONS

Anderson et al.; "Quantitative Analysis of Commercial Bisphenol A by Paper Chromatography"; Analytical Chemistry; vol. 31, No. 7; 1959; p. 1214-1217.

Brunelle, D.J.: "Polycarbonates", Encyclopedia of Polymer Science and Technology, Jan. 1, 2006, pp. I.1-33, XP002525090, DOI: 10.1002/0471440264PST255.PUB2, Retrieved from the Internet: URL: http://mrw.interscience.wiley.com/emrw/9780471440260/epst/article/p.

Brydia; "Determination of Bisphenol A and Impurities by Gas Chromatography of Their Trimethylsilyl Ether Derivatives" Analytical Chemistry; vol. 40, No. 14; 1968; pp. 2212-2215.

Chan et al., "Facile Quantitative Analysis of Hydroxyl End Groups of Poly (2,6-dimethyl-1,4-phenylene oxide)s by 31P NMR Spectroscopy", Macromolecules (1994), vol. 27, pp. 6371-6375.

(Continued)

*Primary Examiner* — Terressa Boykin
(74) *Attorney, Agent, or Firm* — Cantor Colburn LLP (57) ABSTRACT

A plastic article formed from a thermoplastic composition including a polycarbonate having repeating structural carbonate units according to the formula:

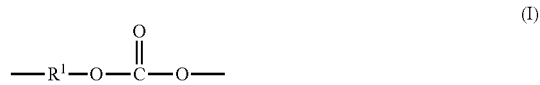

in which at least 60 percent of the total number of $R^1$ groups contain aromatic moieties and the balance thereof are aliphatic, alicyclic, or aromatic. The composition also includes an epoxy additive having at least two epoxy groups per molecule and a phenolic diphosphite derived from pentaerythritol. The thermoplastic composition exhibits a dE (2000 hrs.) value of less than 1.5 after 2000 hours of heat aging at 130° C., measured according ISO 11664-4:2008(E)/CIE S 014-4/E: 2007 using CIE illuminant D65 and a 2.5 mm thick molded plaque of the thermoplastic composition.

22 Claims, 1 Drawing Sheet

(56) References Cited

U.S. PATENT DOCUMENTS

| | | | |
|---|---|---|---|
| 2009/0054586 | A1 | 2/2009 | Hein et al. |
| 2010/0137549 | A1 | 6/2010 | Takahashi et al. |
| 2011/0127904 | A1 | 6/2011 | Tsai |
| 2011/0140593 | A1 | 6/2011 | Negley et al. |
| 2011/0151262 | A1 | 6/2011 | Heuer et al. |
| 2011/0278614 | A1 | 11/2011 | Maier-Richter et al. |
| 2012/0043552 | A1 | 2/2012 | David et al. |
| 2013/0035441 | A1 | 2/2013 | De Brouwer et al. |
| 2013/0094179 | A1 | 4/2013 | Dai et al. |
| 2013/0108820 | A1 | 5/2013 | Belfadhel et al. |
| 2013/0221837 | A1 | 8/2013 | De Brouwer et al. |
| 2013/0270591 | A1 | 10/2013 | De Brouwer et al. |
| 2014/0051802 | A1 | 2/2014 | De Brouwer et al. |
| 2014/0051803 | A1 | 2/2014 | De Brouwer et al. |

FOREIGN PATENT DOCUMENTS

| | | |
|---|---|---|
| CN | 102134383 A | 7/2011 |
| CN | 202091807 U | 12/2011 |
| DE | 102006016548 A1 | 10/2006 |
| EP | 0320658 A1 | 6/1989 |
| EP | 0475893 A1 | 3/1992 |
| EP | 0523931 A2 | 1/1993 |
| EP | 0885929 A1 | 12/1998 |
| EP | 1234845 A2 | 8/2002 |
| EP | 1500671 A1 | 1/2005 |
| EP | 2143750 A1 | 1/2005 |
| EP | 1808726 A1 | 7/2007 |
| EP | 1925874 A1 | 5/2008 |
| EP | 2248841 A1 | 11/2010 |
| JP | 2004149623 A | 5/2004 |
| JP | 2004231935 A | 8/2004 |
| JP | 2005037591 A | 2/2005 |
| JP | 2005048154 A | 2/2005 |
| JP | 2005082713 A | 3/2005 |
| JP | 2005115051 A | 4/2005 |
| JP | 2006339033 A | 12/2006 |
| JP | 2008184482 A | 8/2008 |
| JP | 2011029051 A | 2/2011 |
| KR | 20110033772 A | 3/2011 |
| WO | 9209550 A1 | 6/1992 |
| WO | 0059853 A1 | 10/2000 |
| WO | 2011082204 A1 | 7/2011 |
| WO | 2011134674 A1 | 11/2011 |
| WO | 2012150559 A1 | 11/2012 |
| WO | 2013021332 A1 | 2/2013 |
| WO | 2013061274 A1 | 5/2013 |

OTHER PUBLICATIONS

Chinese Patent No. 101205358 (A); Publication Date: Jun. 25, 2008; Abstract Only; 1 Page.
Chinese Patent No. 101885907 (A); Publication Date: Nov. 17, 2010; Abstract Only; 1 Page.
Chinese Patent No. 102134383 (A); Publication Date: July 27, 2011; Abstract Only; 1 Page.
Chinese Patent No. 202091807 (U); Publication Date: Dec. 28, 2011; Abstract Only; 1 Page.
Chou et al.; "The Optimum Conditions for Solid-State-Prepared (Y3-xCex)Al5O12 Phosphor Using the Taguchi Method"; Advanced Powder Technology; vol. 12; 2012; pp. 97-103.
De Brouwer et al.; "Lexan* Polycarbonate for Optical Applications"; SABIC Innovative Plsatics; Received Aug. 2, 2011; 5 Pages.
Factor et al.; "The Use of 31P NMR to Identify Color Bodies in y-irradiated Bisphenol-A Polycarbonate*"Polymer Degradation and Stability; vol. 57; 1997; pp. 83-86.
Factor; "Search for the Sources of Color in Thermally Aged, Weathered and y-Ray Irradiated Bisphenol A Polycarbonate"; Die Angewandte Makromolekulare Chemie; vol. 232; 1995; pp. 27-43.
Godinez et al.; "Experimental Study of the Influence of Raw Material Impurities on Yellowness Index of Transesterification Polycarbonate"; Journal of Applied Polymer Science; vol. 119; 2011; pp. 1348-1356.
Japanese Patent No. 2004149623 (A); Publication Date: May 27, 2004; Abstract Only; 1 Page.
Japanese Patent No. 2004231935 (A); Publication Date: Aug. 19, 2004; Abstract Only; 1 Page.
Japanese Patent No. 2005037591 (A); Publication Date: Feb. 10, 2005; Abstract Only; 2 Pages.
Japanese Patent No. 2005048154 (A); Publication Date: Feb. 24, 2005; Abstract Only; 1 Page.
Japanese Patent No. 2005115051 (A); Publication Date: Apr. 28, 2005; Abstract Only; 1 Page.
Japanese Patent No. 2006339033 (A); Publication Date: Dec. 14, 2006; Abstract Only; 2 Pages.
Japanese Patent No. 2008184482 (A); Publication Date: Aug. 14, 2008; Abstract Only; 1 Page.
Japanese Patent No. 2011029051 (A); Publication Date: Feb. 10, 2011; Abstract Only; 2 Pages.
Li et al.; "Design of Mechanically Robust High-Tg Polymers: Synthesis and Dynamic Machanical Relaxation Behavior of Glassy Poly-(ester carbonate)s with Cyclohexylene Rings in the Backbone"; Macromolecules; vol. 36; 2003; pp. 9411-9420.
Liptak et al.; "Absolute pKa Determination for Substituted Phenols"; J. Am. Chem. Soc.; vol. 124; 2002; pp. 6421-6427.
Nowakowska et al.; "Studies of Some Impurities in Commercial Bisphenol-A"; Polish Journal of Applied Chemistry; vol. XL, No. 3; 1996; pp. 247-254.
Poskrobko et al.; "High-Performance Liquid Chromatography wtih Multi-Wavelength Detection of the Bisphenol A Impurities"; Journal of Chromatography A; vol. 883; 2000; pp. 291-297.
International Search Report for International Application No. PCT/IB2014/061794; International Filing Date: May 28, 2014; Date of Mailing Nov. 5, 2014; 4 Pages.
Written Opinion of the International Searching Authority for International Application No. PCT/IB2014/061794; International Filing Date: May 28, 2014; Date of Mailing Nov. 5, 2014; 5 Pages.

COLOR STABLE THERMOPLASTIC COMPOSITION

CROSS-REFERENCE TO RELATED APPLICATIONS

The present application is a Non-Provisional and claims the benefit of U.S. Provisional Application No. 61/828,413, filed on May 29, 2013, the contents of which are incorporated herein in its entirety by reference.

BACKGROUND OF THE INVENTION

This disclosure relates to polycarbonate compositions and in particular to polycarbonate compositions having enhanced optical properties, methods of manufacture, and uses thereof.

Polycarbonates can provide a number of beneficial properties, and are used in the manufacture of articles and components for a wide range of applications, from automotive parts to electronic appliances. Polycarbonates, however, can undergo changes in their light absorbing and/or transmitting properties when they age, especially under the influence of heat and/or light exposure, resulting in reduced light transmission and/or color changes. For example, polycarbonates can develop a yellowish tint and become darker when processed into an article and when aged under the influence of heat and/or light.

There accordingly remains a need in the art for polycarbonate compositions that can provide desirable light absorbing and/or transmitting properties under various aging conditions, including polycarbonate compositions that have low yellowness and high light transmission when processed into an article (e.g. through injection molding) and/or when aged at elevated temperatures or extended durations).

It is well known that certain additives can improve the color characteristics of virgin polycarbonate. Primary antioxidants such as hindered phenols can be added to polycarbonates to reduce discoloration of the formed articles during aging. These additives protect the material in the solid state against discoloration over time. Secondary antioxidants such as phosphites can protect the material during high temperature processing in the molten state such as with injection molding, leading to a better color of the formed article. These two types of antioxidants can be combined to optimize both the color of the article after formation as well as during its lifetime; however, this combination may not be effective to achieve desired discoloration performance in various applications such as long-pathlength lighting applications such as thick lenses, light guides etc. Although certain secondary antioxidants, e.g. those based on pentaerythriol, can be effective during molding, they reduce the longer term color stability and therefore cannot be added at high level.

Multifunctional epoxides can be used as additives for polymeric resins with the aim of increasing viscosity, improving hydrolytic stability and recyclability. However, for many polycarbonate compositions such as those having a free hydroxy content of greater than 150 ppm and/or prepared from a bisphenol having a sulfur content of greater than 2 ppm by weight, the epoxy additive can actually increase the yellowness of molded article.

EP 0 320 658 A1 indicates that a pentaerythrol based phosphite stabilizer is useful as a process stabilizer for polycarbonate compositions, but does not study the effect of (heat) aging. The patent indicates epoxy additives should not be added to the composition.

EP 0 885 929 A1 discloses compositions containing pentaerythrol based diphosphites and epoxy additives with the aim of improving processability, reducing splay and improving hydrolytic stability. No heat aging is investigated. BPA organic purity higher than 99.7% and/or restrictions to the hydroxyl content in the BPA used to make the polycarbonate are not being described.

U.S. Pat. No. 4,076,686 discloses polycarbonate compositions containing epoxy and phosphites indicating and advantage when replacing a dialkyl hydrogen phosphite partly with an epoxy additive. The advantage that is shown in color stability is small and appears to be due to the lowering of the phosphite level.

U.S. Pat. No. 7,297,381 discloses polycarbonate compositions containing epoxy and phosphite for light-diffusing films and articles. These materials contain light diffusing particles which render them unsuitable for use in lenses, light guides, display panels and other applications in which transparency is key.

US2013/0035441A1 discloses interfacially polymerized transparent polycarbonates where the polycarbonate has lower than 150 ppm hydroxyl groups and less than 2 ppm sulfur compounds with advantageous optical properties such as low starting color and good color stability in heat aging. US2013/0108820A1 discloses a process to make BPA and polycarbonate having a reduced sulfur content as well as containers made of such polycarbonate. Polycarbonates made according to these inventions exhibit improved color stability over other polycarbonates, but for long light path length applications or applications involving close proximity to light sources, further improvement is desired.

In spite of the advances described in the above references, there remains a need to achieve further improvements in starting color and color stability of polycarbonates for use in light-transmitting applications.

SUMMARY OF THE INVENTION

The above-described and other deficiencies of the art are addressed by a thermoplastic composition comprising a polycarbonate having repeating structural carbonate units according to the formula (1):

in which at least 60 percent of the total number of $R^1$ groups contain aromatic moieties and the balance thereof are aliphatic, alicyclic, or aromatic; the polycarbonate having been prepared through an interfacial polymerization process from BPA monomer of an organic purity higher than 99.70% w and having a hydroxyl content lower than 150 ppm; 0.01 wt. % to 0.30 wt. %, based on the total weight of the thermoplastic composition, of an epoxy additive having at least two epoxy groups per molecule; and 0.01 wt. % to 0.30 wt. %, based on the total weight of the thermoplastic composition, of a phenolic diphosphite derived from pentaerythritol. The thermoplastic composition also has a sulfur content of less than 2 parts per million (ppm) based on the total weight of the thermoplastic composition. The thermoplastic composition exhibits a dE value of less than 2.0 after 2000 hours of heat aging at 130° C., measured according to ISO 11664-4:2008 (E)/CIE S 014-4/E:2007 using CIE illuminant D65 and a 2.5 mm thick molded plaque of the thermoplastic composition.

In another embodiment, a method of manufacture comprises blending the above-described components to form a thermoplastic composition, and molding, extruding, or shaping the above-described thermoplastic composition into an article.

The above described and other features are further described by the following figures and detailed description.

BRIEF DESCRIPTION OF THE DRAWINGS

The foregoing and other features, and advantages of the invention are described in the following detailed description taken in conjunction with the accompanying drawings in which.

DETAILED DESCRIPTION OF THE INVENTION

As described herein, articles with desirable optical properties can be formed from the above-described thermoplastic composition comprising a polycarbonate, also referred to as a polycarbonate composition. The thermoplastic composition exhibits a dE (2000 hours) value of less than 2.0, more specifically less than 1.5, and even more specifically less than 0.95 after 2000 hours of heat aging at 130° C., with the dE calculation based on a comparison between an un-aged sample and a sample subjected to 2000 hours of heat aging at 130° C., measured according ISO 11664-4:2008(E)/CIE S 014-4/E:2007 using CIE illuminant D65 and a 2.5 mm thick molded plaque of the thermoplastic composition. The color stability indicated by the above-described dE (2000 hrs.) values can be beneficial for compositions having an initial color that can be described by various CIELAB color space values, as specified by ISO 11664-4:2008(E)/CIE S 014-4/E:2007. With initial color, or starting color is meant the color of a molded plaque short after molding, before any aging (thermal, light) has taken place which might change the color of the plaque. In some exemplary embodiments, the thermoplastic exhibits CIELAB 1976 color space values of b*<0.56 and L*>95.65, measured according to ISO 11664-4:2008(E)/CIE S 014-4/E:2007 using CIE illuminant D65 and a 2.5 mm thick molded plaque of the thermoplastic composition. In some exemplary embodiments, the thermoplastic exhibits CIELAB 1976 color space values of b*<0.54 and L*>95.75, determined as described above. In some exemplary embodiments, the thermoplastic exhibits CIELAB 1976 color space values of b*<0.52 and L*>95.85, determined as described above. In some exemplary embodiments, the plaque of the thermoplastic composition exhibits CIELAB 1976 color space values of b*<0.56 and L*>95.85, determined as described above. Unless otherwise specified, the dE (2000 hrs.) value and the CIELAB 1976 color space values, are all determined based on color measurements made using a Macbeth 7000A spectrophotometer with a D65 illuminant, 10° observer, in transmission mode, specular included, ultraviolet component excluded, and both lens and aperture set to large, where dE is calculated according to ISO 11664-4:2008(E)/CIE S 014-4/E:2007. This standard is also known as the LAB 1976 standard, and dE values determined according to this standard may also be referred to herein as dE1976 or dE76.

As mentioned above, the thermoplastic composition includes a polycarbonate. A "polycarbonate" means compositions having repeating structural carbonate units of formula (1)

(1)

in which at least 60 percent of the total number of $R^1$ groups contain aromatic moieties and the balance thereof are aliphatic, alicyclic, or aromatic. The polycarbonate is prepared through an interfacial polymerization process from BPA monomer of an organic purity higher than 99.70 wt. % and having a hydroxyl content lower than 150 ppm, each based on the total weight of BPA monomer. In some embodiments, each $R^1$ is a $C_{6-30}$ aromatic group, that is, contains at least one aromatic moiety. $R^1$ can be derived from a dihydroxy compound of the formula HO—$R^1$—OH, in particular of formula (2)

(2)

wherein each of $A^1$ and $A^2$ is a monocyclic divalent aromatic group and $Y^1$ is a single bond or a bridging group having one or more atoms that separate $A^1$ from $A^2$. In some embodiments, one atom separates $A^1$ from $A^2$. Specifically, each $R^1$ can be derived from a dihydroxy aromatic compound of formula (3)

(3)

wherein $R^a$ and $R^b$ are each independently a halogen, $C_{1-12}$ alkoxy, or $C_{1-12}$ alkyl; and p and q are each independently integers of 0 to 4. It will be understood that $R^a$ is hydrogen when p is 0, and likewise $R^b$ is hydrogen when q is 0. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In some embodiments, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In some embodiments, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=$R^e$)— wherein $R^e$ is a divalent $C_{1-12}$ hydrocarbon group. groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In some embodiments, $X^a$ can be a $C_{1-18}$ alkylene group, a $C_{3-18}$ cycloalkylene group, a fused $C_{6-18}$ cycloalkylene group, or a group of the formula —$B^1$-G-$B^2$— wherein $B^1$ and $B^2$ are the same or different $C_{1-6}$ alkylene group and G is a $C_{3-12}$ cycloalkylidene group or a $C_{6-16}$ arylene group. For example, $X^a$ can be a substituted $C_{3-18}$ cycloalkylidene of formula (4)

(4)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone.

Bisphenols (4) can be used in the manufacture of polycarbonates containing phthalimidine carbonate units of formula (4a)

(4a)

wherein $R^a$, $R^b$, p, and q are as in formula (4), $R^3$ is each independently a $C_{1-6}$ alkyl group, j is 0 to 4, and $R_4$ is a $C_{1-6}$ alkyl, phenyl, or phenyl substituted with up to five $C_{1-6}$ alkyl groups. In particular, the phthalimidine carbonate units are of formula (4b)

(4b)

wherein $R^5$ is hydrogen or a $C_{1-6}$ alkyl. In an embodiment, $R^5$ is hydrogen. Carbonate units (4a) wherein $R^5$ is hydrogen can be derived from 2-phenyl-3,3'-bis(4-hydroxy phenyl)phthalimidine (also known as N-phenyl phenolphthalein bisphenol, or "PPPBP") (also known as 3,3-bis(4-hydroxyphenyl)-2-phenylisoindolin-1-one).

Other bisphenol carbonate repeating units of this type are the isatin-derived carbonate units of formula (4c) and (4d)

(4c)

(4d)

wherein $R^a$ and $R^b$ are each independently $C_{1-12}$ alkyl, p and q are each independently 0 to 4, and $R^i$ is $C_{1-12}$ alkyl, phenyl, optionally substituted with 1 to 5 to $C_{1-10}$ alkyl, or benzyl optionally substituted with 1 to 5 $C_{1-10}$ alkyl. In an embodiment, $R^a$ and $R^b$ are each methyl, p and q are each independently 0 or 1, and $R^i$ is $C_{1-4}$ alkyl or phenyl.

Examples of bisphenol carbonate units derived from bisphenols (4) wherein $X^a$ is a substituted or unsubstituted $C_{3-18}$ cycloalkylidene include the cyclohexylidene-bridged, alkyl-substituted bisphenol of formula (4e)

(4e)

wherein $R^a$ and $R^b$ are each independently $C_{1-12}$ alkyl, $R^9$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^8$ is $C_{1-4}$ alkyl, p and q are each 0 or 1, and t is 0 to 5. In another specific embodiment, $R^a$, $R^b$, and $R^8$ are each methyl, r and s are each 0 or 1, and t is 0 or 3, specifically 0. For example, Examples of other bisphenol carbonate units derived from bisphenol (4) wherein $X^a$ is a substituted or unsubstituted $C_{3-18}$ cycloalkylidene include units (4f)(also known as adamantyl units) and units (4g)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1. In another specific embodiment, $R^a$, $R^b$ are each methyl, p and q are each 0 or 1. Carbonates containing units (4a) to (4g) are useful for making polycarbonates with high glass transition temperatures (Tg) and high heat distortion temperatures.

Other useful aromatic dihydroxy compounds of the formula HO—$R^1$—OH include compounds of formula (6)

wherein each $R^h$ is independently a halogen atom, a $C_{1-10}$ hydrocarbyl such as a $C_{1-10}$ alkyl group, a halogen-substituted $C_{1-10}$ alkyl group, a $C_{6-10}$ aryl group, or a halogen-substituted $C_{6-10}$ aryl group, and n is 0 to 4. The halogen is usually bromine.

Some illustrative examples of specific aromatic dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(4-hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In one specific embodiment, the polycarbonate is a linear homopolymer derived from bisphenol A, in which each of $A^1$ and $A^2$ is p-phenylene and $Y^1$ is isopropylidene in formula (3).

In some embodiments, the polycarbonate is derived from a bisphenol such as bisphenol A. For example, at least 90% of the R1 groups in formula (1) can be derived from a bisphenol such as bisphenol A. In some embodiments, all of the R1 groups are derived from a bisphenol such as bisphenol A. In more specific embodiments, the bisphenol has a sulfur content and/or a free hydroxyl group content as described in US 2013/0035441 A1 and US 2013/0108820 A1, the disclosures of which are incorporated herein by reference in their entirety. In some exemplary embodiments, the bisphenol has less than or equal to 150 ppm by weight free hydroxyl groups, based on the weight of the bisphenol. In some exemplary embodi- ments, the bisphenol comprises less than 2 ppm by weight sulfur, based on the weight of the bisphenol. In some exemplary embodiments the bisphenol comprises from greater than 0 to 2 ppm, e.g., 0.5 ppm to 2 ppm by weight sulfur, and in some exemplary embodiments the bisphenol comprises less than 0.5 ppm by weight sulfur, based on the weight of the bisphenol.

In some embodiments, the above-described bisphenol sulfur levels can be achieved using the melt crystal purification techniques described in the above-referenced US 2013/0108820A1. In some exemplary embodiments, a method of making a purified bisphenol comprises reacting phenol with acetone in the presence of a sulfur containing promoter to obtain a reaction mixture comprising a bisphenol such as bisphenol A, phenol, and the promoter, then cooling the reaction mixture to form a crystal stream comprising crystals of bisphenol and phenol and separating the crystals from the crystal stream. The separated crystals are then melted to form a molten stream of bisphenol, phenol, and sulfur; and this molten stream is contacted with a base to reduce a sulfur concentration in the molten stream and form a reduced sulfur stream. Phenol is then removed by desorption from this reduced sulfur stream, leaving a product stream of low sulfur-content bisphenol. In some exemplary embodiments, the promoter comprises a catalyst selected from 3-mercaptopropionic acid, methyl mercaptan, ethyl mercaptan, 2,2-bis(methylthio)propane, mercaptocarboxylic acid, and combinations comprising at least one of the foregoing promoters. In some exemplary embodiments, the promoter comprises 3-mercaptopropionic acid. In some exemplary embodiments, the base is an alkali solution. In some exemplary embodiments, the base is an anion exchange resin such as a tert-amine divinylbenzene/styrene ion exchange copolymer. In some exemplary embodiments, additional phenol is added to the molten stream prior to contacting the stream with a base.

In some embodiments, a high-purity bisphenol useful in preparing the polycarbonates used in the compositions described herein is prepared using an attached promoter ion exchange resin catalyst system, optionally in conjunction with a solvent crystallization step. The preparation of such high-purity bisphenols is described in US 2014/0051802A1 and US 2014/0051803A1, the disclosures of both of which are incorporated herein by reference in their entirety. In some exemplary embodiments, a bisphenol is prepared by contacting a phenol and at least one of a ketone, an aldehyde, or a combination thereof in the presence of an attached ion exchange resin catalyst comprising a dimethyl thiazolidine promoter, without utilizing a pretreatment and/or purification step for the phenol, ketone, and/or aldehyde. Solvent crystallization can be performed on reactor effluent from the above-described reaction after flashing off phenol from the reactor effluent.

"Polycarbonates" as used herein includes homopolycarbonates (wherein each $R^1$ in the polymer is the same), copolymers comprising different $R^1$ moieties in the carbonate ("copolycarbonates"), copolymers comprising carbonate units and other types of polymer units, such as ester units, and combinations comprising at least one of homopolycarbonates and/or copolycarbonates.

A specific type of copolymer is a polyester carbonate, also known as a polyester-polycarbonate. Such copolymers further contain, in addition to recurring carbonate chain units of formula (1), repeating units of formula (7)

wherein J is a divalent group derived from a dihydroxy compound, and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, specifically 2, 3, or 4 carbon atoms; and T is a divalent group derived from a dicarboxylic acid, and can be, for example, a $C_{2-10}$ alkylene, a $C_{6-20}$ cycloalkylene, or a $C_{6-20}$ arylene. Copolyesters containing a combination of different T and/or J groups can be used. The polyesters can be branched or linear. In another embodiment, J is a $C_{2-30}$ alkylene group having a straight chain, branched chain, or cyclic (including polycyclic) structure. J can be derived from an aromatic dihydroxy compound of formula (3) above, or from an aromatic dihydroxy compound of formula (4) above, or from an aromatic dihydroxy compound of formula (6) above.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Specific dicarboxylic acids include terephthalic acid, isophthalic acid, naphthalene dicarboxylic acid, cyclohexane dicarboxylic acid, or a combination comprising at least one of the foregoing acids. A specific dicarboxylic acid comprises a combination of isophthalic acid and terephthalic acid wherein the weight ratio of isophthalic acid to terephthalic acid is 91:9 to 2:98. In another specific embodiment, J is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In an embodiment, the polyester unit of a polyester-polycarbonate is derived from the reaction of a combination of isophthalic and terephthalic diacids (or derivatives thereof) with resorcinol. In another embodiment, the polyester unit of a polyester-polycarbonate is derived from the reaction of a combination of isophthalic acid and terephthalic acid with bisphenol A. In another embodiment, the polycarbonate units are derived from bisphenol A. In another embodiment, the polycarbonate units are derived from resorcinol and bisphenol A in a molar ratio of resorcinol carbonate units to bisphenol A carbonate units of 1:99 to 99:1.

The polycarbonates described herein are manufactured by interfacial polymerization. Although the reaction conditions for interfacial polymerization can vary, a process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like.

Carbonate precursors include a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. Phosgene can also be a carbonate precursor in, an interfacial polymerization reaction to form carbonate linkages, which is referred to as a phosgenation reaction.

Among the phase transfer catalysts that can be used are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3$-$[CH_3(CH_2)_3]_3NX$, and $CH_3$-$[CH_3(CH_2)_2]_3NX$, wherein X is Cl$^-$, Br$^-$, a $C_{1-8}$ alkoxy group or a $C_{6-18}$ aryloxy group. A phase transfer catalyst can be used in an amount of 0.1 to 10 wt %, more specifically from 0.5 to 2 wt %, based on the weight of bisphenol in the polymerization reaction mixture.

All types of polycarbonate end groups are contemplated as being useful in the polycarbonate composition, provided that such end groups do not significantly adversely affect desired properties of the compositions.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt %, based on the total weight of the polymer. Mixtures comprising linear polycarbonates and branched polycarbonates can be used.

A chain stopper (also referred to as a capping agent) can be included during polymerization. The chain stopper limits molecular weight growth rate, and so controls molecular weight in the polycarbonate. Chain stoppers include certain mono-phenolic compounds, mono-carboxylic acid chlorides, and/or mono-chloroformates. Mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryoyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Polyester-polycarbonates can be prepared by techniques and materials as described above for polycarbonates in general. Rather than utilizing the dicarboxylic acid or diol per se, the reactive derivatives of the acid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

As mentioned above, the thermoplastic composition also includes an epoxy additive having at least two epoxy groups per molecule. In some embodiments, the epoxy additive is an aliphatic epoxide having at least two epoxy groups per molecule and a molecular weight lower than 600 g/mol. Epoxy compounds useful as additives include epoxy modified acrylic oligomers or polymers (such as a styrene-acrylate-epoxy polymer, prepared from for example a combination of: a substituted or unsubstituted styrene such as styrene or 4-methylstyrene; an acrylate or methacrylate ester of a $C_{1-22}$ alkyl alcohol such as methyl acrylate, methyl methacrylate, ethyl acrylate, butyl acrylate, or the like; and an epoxy-functionalized acrylate such as glycidyl acrylate, glycidyl methacrylate, 2-(3,4-epoxycyclohexyl)ethyl acrylate, 2-(3,4-epoxycyclohexyl)ethyl methacrylate, or the like), or an epoxy carboxylate oligomer based on cycloaliphatic epoxides (such as, for example, 3,4-epoxycyclohexylmethyl-3,4-epoxycyclohexylcarboxylate, or the like).

The epoxy additive may comprise an additional functional group such as hydroxyl, carboxylic acid, carboxylic acid ester, and the like. More than one functional group may be present. Specific examples of the epoxy stabilizer include epoxidized soybean oil, epoxidized linseed oil, phenyl glycidyl ether, allyl glycidyl ether, tert-butylphenyl glycidyl ether, 3,4-epoxycyclohexylmethyl-3,4'-epoxy cyclohexyl carboxylate, 3,4-epoxy-6-methylcylohexylm ethyl-3',4'-epoxy-6'-methylcyclohexyl carboxylate, 2,3 epoxycyclohexyl-methyl-3',4'-epoxycyclohexyl carboxylate, 4-(3,4-epoxy-5-methylcyclohexyl)butyl-3',4'-epoxycyclohexyl carboxylate, 3,4-epoxycyclohexylethyleneoxide, cyclohexylmethyl-3,4-epoxycyclohexyl carboxylate, 3,4epoxy-6-methylcyclohexylmethyl-6'-methylcyclohexyl carboxylate, bisphenol A glycidyl ether, tetrabromobisphenol A glycidyl ether, diglycidyl phthalate, diglycidyl hexahydrophthalate, bis-epoxydicyclopentadienyl ether, bis-epoxyethylene glycol, bis-epoxycyclohexyl adipate, butadiene diepoxide, tetraphenylethylene epoxide, octyl epoxyphthalate, epoxidized polybutadiene, 3,4-dimethyl-1,2-epoxycyclo hexane, 3,5-dimethyl-1,2-epoxycyclohexane, 3-methyl-5 tert-butyl-1,2-epoxycyclohexane, octadecyl-2,2-dimethyl 3,4-epoxycyclohexyl carboxylate, N-butyl-2,2-dimethyl-3,4-epoxycyclohexyl carboxylate, cyclohexyl-2-methyl-3,4 epoxycyclohexyl carboxylate, N-butyl-2-isopropyl-3,4epoxy-5-methylcyclohexyl carboxylate, octadecyl-3,4 epoxycyclohexyl carboxylate, 2-ethylhexyl-3',4' epoxycyclohexyl carboxylate, 4,6-dimethyl-2,3 epoxycyclohexyl-3',4'-epoxycyclohexyl carboxylate, 4,5 epoxytetrahydrophthalic anhy- dride, 3-tert-butyl-4,5 epoxytetrahydrophthalic anhydride, diethyl-4,5-epoxy-cis 1,2-cyclohexyl dicarboxylate, and di-n-butyl-3-tert-butyl-4,5-epoxy-cis-1,2-cyclohexyl dicarboxylate. The epoxy compounds can be used singly or in combination. Of these, epoxy carboxylates such as alicyclic epoxy carboxylates (e.g., 3,4-epoxycyclohexylmethyl-3',4'-epoxycyclo hexyl carboxylate) can be used.

In some embodiments, the epoxy additive is a carboxylate epoxy resin comprising a carboxylate diepoxide according to the formula:

Specific commercially available exemplary epoxy functionalized stabilizers include Cycloaliphatic Epoxide Resin ERL-4221 supplied by Union Carbide Corporation (a subsidiary of Dow Chemical), Danbury, Conn.; and epoxy functional acrylic (co)polymers such as JONCRYL® ADR-4300 and JONCRYL® ADR-4368, available from BASF Corporation, Sturtevant, Wis. Epoxy additives can be used in different amounts, for example from 0.01 to 0.25 wt. %, more specifically from 0.02 wt. % to 0.10 wt. %, based on the weight of the thermoplastic composition.

As mentioned above, the thermoplastic composition also includes a phenolic diphosphite derived from pentaerythritol. In some embodiments, the phenolic diphosphite is a compound according to the formula:

wherein $R_1$, $R_2$, $R_3$, $R_4$, $R_5$, $R_6$, $R_7$, $R_8$, $R_9$, and $R_{10}$ each independently represents hydrogen or a $C_{1-20}$ organic radical. In some embodiments, the position on the phenolic phenyl group to which the oxygen is attached is hindered, for example at the ortho and para positions. With respect to the above formula, for example, in some embodiments $R_2$, $R_5$, $R_5$, $R_7$, $R_9$, and $R_{10}$ are H and $R_1$, $R_2$, $R_6$, and $R_8$ each independently represents a $C_{1-20}$ organic radical, more specifically an alkaryl radical of 4 to 13 carbon atoms such as cumyl (e.g., bis(2,4-dicumyl)pentaerythritol diphosphite). Examples of phenolic diphosphites are disclosed in U.S. Pat. Nos. 5,364,895; 5,438,086; 6,613,823, the disclosures of which are incorporated herein by reference in their entirety. Phenolic diphosphates are also available commercially, e.g. under the Doverphos* brand, e.g., Doverphos* S-9228 and from ADK palmarole (e.g. ADK STAB PEP-36). The phenolic diphosphite can be present in the thermoplastic composition at different levels, for example, 0.02 wt. % to 0.30 wt. %, more specifically from 0.05 wt. % to 0.15 wt. %, based on the weight of the thermoplastic composition.

The thermoplastic composition can further include additional additives as described below, with the proviso that the additive(s) are selected so as to not significantly adversely affect the desired properties of the thermoplastic composition, in particular the above-described optical properties.

Such additives can be mixed at a suitable time during the mixing of the components for forming the composition. additives include reinforcing agents, antioxidants, heat stabilizers, light stabilizers (including ultraviolet (UV) light stabilizers), plasticizers, lubricants, mold release agents, antistatic agents, surface effect additives, radiation stabilizers, flame retardants, and anti-drip agents. Combinations of additives can also be used.

Antioxidant additives include additional organophosphites in addition to the phenolic diphosphite derived from pentaerythritol, such as tris(nonyl phenyl)phosphite, tris(2,4-di-t-butylphenyl)phosphite, distearyl pentaerythritol diphosphite; alkylated monophenols or polyphenols; alkylated reaction products of polyphenols with dienes, such as tetrakis [methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition.

Heat stabilizer additives include organophosphites such as triphenyl phosphite, tris-(2,6-dimethylphenyl)phosphite, tris-(mixed mono- and di-nonylphenyl)phosphite; phosphonates such as dimethylbenzene phosphonate, phosphates such as trimethyl phosphate, or combinations comprising at least one of the foregoing heat stabilizers. Heat stabilizers are used in amounts of 0.01 to 0.1 parts by weight, based on 100 parts by weight of the total composition.

Light stabilizers (including ultraviolet light (UV) absorbers) can also be used. Light stabilizers include benzotriazoles such as 2-(2-hydroxy-5-methylphenyl)benzotriazole and 2-(2-hydroxy-5-tert-octylphenyl)-benzotriazole, 2-hydroxy-4-n-octoxy benzophenone, or combinations comprising at least one of the foregoing light stabilizers. Light stabilizers are used in amounts of 0.01 to 5 parts by weight, based on 100 parts by weight of the total composition.

UV absorbers include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB 5411); 2-hydroxy-4-n-octyloxybenzophenone (CYASORB 531); 2-[4,6-bis(2,4-dimethylphenyl)-1,3,5-triazin-2-yl]-5-(octyloxy)-phenol (CYASORB 1164); 2,2'-(1,4-phenylene)bis (4H-3,1-benzoxazin-4-one) (CYASORB UV-3638); 1,3-bis[(2-cyano-3,3-diphenylacryloyl)oxy]-2,2-bis[[(2-cyano-3,3-diphenylacryloyl)oxy]methyl]propane (UVINUL* 3030); 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; phenol, 2-(2H-benzotriazol-2-yl)-4,6-bis(1-methyl-1-phenylethyl)-(TINUVIN* 234); BCAP bismalonate from Clariant; nano-size inorganic materials such as titanium oxide, cerium oxide, and zinc oxide, all with particle size less than or equal to 100 nanometers; or combinations comprising at least one of the foregoing UV absorbers. UV absorbers are used in amounts of 0.01 to 5 parts by weight, based on 100 parts by weight of the total composition. Additives stabilizing against discoloration by gamma irradiation can also be used in the composition. Examples of such stabilizers are polyether polyols, polyether polyolesters, aromatic disulfides, hexylene glycol, poly (alkyleneglycol). Gamma stabilizing additives can be present in levels of 0.01 to 1.0 parts by weight, based on 100 parts by weight of the total composition.

Plasticizers, lubricants, and/or mold release agents can also be used. There is considerable overlap among these types of materials, which include phthalic acid esters such as dioctyl-4,5-epoxy-hexahydrophthalate; tris-(octoxycarbonylethyl) isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly (ethylene glycol-co-propylene glycol) copolymers, or a combination comprising at least one of the foregoing glycol polymers, e.g., methyl stearate and polyethylene-polypropylene glycol copolymer in a solvent; waxes such as beeswax, montan wax, and paraffin wax. Such materials are used in amounts of 0.1 to 1 parts by weight, based on 100 parts by weight of the total composition.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Flame retardant aromatic phosphates include triphenyl phosphate, tricresyl phosphate, isopropylated triphenyl phosphate, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, and 2-ethylhexyl diphenyl phosphate. Di- or polyfunctional aromatic phosphorus-containing compounds are also useful, for example resorcinol tetraphenyl diphosphate (RDP), the bis(diphenyl) phosphate of hydroquinone and the bis(diphenyl) phosphate of bisphenol A, respectively, and their oligomeric and polymeric counterparts. Flame retardant compounds containing phosphorus-nitrogen bonds include phosphonitrilic chloride, phosphorus ester amides, phosphoric acid amides, phosphonic acid amides, phosphinic acid amides, and tris(aziridinyl) phosphine oxide. When used, phosphorus-containing flame retardants are present in amounts of 0.1 to 30 parts by weight, more specifically 1 to 20 parts by weight, based on 100 parts by weight of the total composition.

Halogenated materials can also be used as flame retardants, for example bisphenols of which the following are representative: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; and 2,2-bis-(3,5-dichloro-4-hydroxyphenyl)-propane 2,2 bis-(3-bromo-4-hydroxyphenyl)-propane. Other halogenated materials include 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, as well as oligomeric and polymeric halogenated aromatic compounds, such as a copolycarbonate of bisphenol A and tetrabromobisphenol A and a carbonate precursor, e.g., phosgene. Metal synergists, e.g., antimony oxide, can also be used with the flame retardant. When present, halogen containing flame retardants are present in amounts of 1 to 25 parts by weight, more specifically 2 to 20 parts by weight, based on 100 parts by weight of the total composition. Alternatively, the thermoplastic composition can be essentially free of chlorine and bromine "Essentially free of chlorine and bromine" is defined as having a bromine and/or chlorine content of less than or equal to 100 parts per million by weight (ppm), less than or equal to 75 ppm, or less than or equal to 50 ppm, based on the total parts by weight of the composition.

Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition.

Tinting colorants can be added to the thermoplastic composition to achieve specifically targeted color space values, subject to compliance with L* specifications or other specifications described herein or elsewhere. Colorants include, for example, anthraquinones, perylenes, perinones, indanthrones, quinacridones, xanthenes, oxazines, oxazolines, thioxanthenes, indigoids, thioindigoids, naphtalimides, cyanines, xanthenes, methines, lactones, coumarins, bis-benzoxazolylthiophenes (BBOT), napthalenetetracarboxylic derivatives, monoazo and disazo pigments, triarylmethanes, aminoketones, bis(styryl)biphenyl derivatives, and the like, as well as combinations comprising at least one of the foregoing colorants. The amount of colorant depends on the target color properties for the article, the spectral absorbance properties of the colorant(s), and the intrinsic color properties of the polycarbonate and any other materials or additives in the thermoplastic composition. The amount can vary, provided that it is kept below the level at which L* falls below target specifications, in some embodiments an L* value of 95.65, in some embodiments an L* value of 95.75, and in some embodiments an L* value of 98.85. Exemplary amounts can range from 0.00005 to 0.01 parts by weight per 100 parts by weight of polycarbonate resin.

Specific exemplary colorants include organic dyes such as coumarin 460 (blue), coumarin 6 (green), nile red or the like; lanthanide complexes; hydrocarbon and substituted hydrocarbon dyes; polycyclic aromatic hydrocarbons; scintillation dyes (preferably oxazoles and oxadiazoles); aryl- or heteroaryl-substituted poly (2-8 olefins); carbocyanine dyes; phthalocyanine dyes and pigments; oxazine dyes; carbostyryl dyes; porphyrin dyes; acridine dyes; anthraquinone dyes; arylmethane dyes; azo dyes; diazonium dyes; nitro dyes; quinone imine dyes; tetrazolium dyes; thiazole dyes; perylene dyes, perinone dyes; bis-benzoxazolylthiophene (BBOT); and xanthene dyes; fluorophores such as anti-stokes shift dyes which absorb in the near infrared wavelength and emit in the visible wavelength, or the like; luminescent dyes such as 5-amino-9-diethyliminobenzo(a)phenoxazonium perchlorate; 7-amino-4-methylcarbostyryl; 7-amino-4-methylcoumarin; 7-amino-4-trifluoromethylcoumarin; 3-(2'-benzimidazolyl)-7-N,N-diethylaminocoumarin; 3-(2'-benzothiazolyl)-7-diethylaminocoumarin; 2-(4-biphenylyl)-5-(4-t-butylphenyl)-1,3,4-oxadiazole; 2-(4-biphenylyl)-5-phenyl-1,3,4-oxadiazole; 2-(4-biphenyl)-6-phenylbenzoxazole-1,3; 2,5-Bis-(4-biphenylyl)-1,3,4-oxadiazole; 2,5-bis-(4-biphenylyl)-oxazole; 4,4'-bis-(2-butyloctyloxy)-p-quaterphenyl; p-bis(o-methylstyryl)-benzene; 5,9-diaminobenzo(a)phenoxazonium perchlorate; 4-dicyanomethylene-2-methyl-6-(p-dimethylaminostyryl)-4H-pyran; 1,1'-diethyl-2,2'-carbocyanine iodide; 1,1'-diethyl-4,4'-carbocyanine iodide; 3,3'-diethyl-4,4',5,5'-dibenzothiatricarbocyanine iodide; 1,1'-diethyl-4,4'-dicarbocyanine iodide; 1,1'-diethyl-2,2'-dicarbocyanine iodide; 3,3'-diethyl-9,11-neopentylenethiatricarbocyanine iodide; 1,3'-diethyl-4,2'-quinolyloxacarbocyanine iodide; 1,3'-diethyl-4,2'-quinolylthiacarbocyanine iodide; 3-diethylamino-7-diethyliminophenoxazonium perchlorate; 7-diethylamino-4-methylcoumarin; 7-diethylamino-4-trifluoromethylcoumarin; 7-diethylaminocoumarin; 3,3'-diethyloxadicarbocyanine iodide; 3,3'-diethylthiacarbocyanine iodide; 3,3'-diethylthiadicarbocyanine iodide; 3,3'-diethylthiatricarbocyanine iodide; 4,6-dimethyl-7-ethylaminocoumarin; 2,2'-dimethyl-p-quaterphenyl; 2,2-dimethyl-p-terphenyl; 7-dimethylamino-1-methyl-4-methoxy-8-azaquinolone-2; 7-dimethylamino-4-methylquinolone-2; 7-dimethylamino-4-trifluoromethylcoumarin; 2-(4-(4-dimethylaminophenyl)-1,3-butadienyl)-3-ethylbenzothiazolium perchlorate; 2-(6-(p-dimethylaminophenyl)-2,4-neopentylene-1,3,5-hexatrienyl)-3-methylbenzothiazolium perchlorate; 2-(4-(p-dimethylaminophenyl)-1,3-butadienyl)-1,3,3-trimethyl-3H-indolium perchlorate; 3,3'-dimethyloxatricarbocyanine iodide; 2,5-diphenylfuran; 2,5-diphenyloxazole; 4,4'-diphenylstilbene; 1-ethyl-4-(4-(p-dimethylaminophenyl)-1,3-butadienyl)-pyridinium perchlorate; 1-ethyl-2-(4-(p-dimethylaminophenyl)-1,3-butadienyl)-pyridinium perchlorate; 1-Ethyl-4-(4-(p-dimethylaminophenyl)-1,3-butadienyl)-quinolium perchlorate; 3-ethylamino-7-ethylimino-2,8-dimethylphenoxazin-5-ium perchlorate; 9-ethylamino-5-ethylamino-10-methyl-5H-benzo(a) phenoxazonium perchlorate; 7-ethylamino-6-methyl-4-trifluoromethylcoumarin; 7-ethylamino-4-trifluoromethylcoumarin; 1,1',3,3,3',3'-hexamethyl-4,4',5,5'-dibenzo-2,2'-indotricarboccyanine iodide; 1,1',3,3,3',3'-hexamethylindodicarbocyanine iodide; 1,1',3,3,3',3'-hexamethylindotricarbocyanine iodide; 2-methyl-5-t-butyl-p-quaterphenyl; N-methyl-4-trifluoromethylpiperidino-<3,2-g> coumarin; 3-(2'-N-methylbenzimidazolyl)-7-N,N-diethylaminocoumarin; 2-(1-naphthyl)-5-phenyloxazole; 2,2'-p-phenylen-bis(5-phenyloxazole); 3,5,3'''',5''''-tetra-t-butyl-p-sexiphenyl; 3,5,3'''',5''''-tetra-t-butyl-p-quinquephenyl; 2,3,5,6-1H,4H-tetrahydro-9-acetylquinolizino-<9,9a,1-gh> coumarin; 2,3,5,6-1H,4H-tetrahydro-9-carboethoxyquinolizino-<9,9a,1-gh> coumarin; 2,3,5,6-1H,4H-tetrahydro-8-methylquinolizino-<9,9a,1-gh> coumarin; 2,3,5,6-1H,4H-tetrahydro-9-(3-pyridyl)-quinolizino-<9,9a,1-gh> coumarin; 2,3,5,6-1H,4H-tetrahydro-8-trifluoromethylquinolizino-<9,9a,1-gh> coumarin; 2,3,5,6-1H,4H-tetrahydroquinolizino-<9,9a,1-gh> coumarin; 3,3','', 3'''-tetramethyl-p-quaterphenyl; 2,5,2'''',5''''-tetramethyl-p-quinquephenyl; P-terphenyl; P-quaterphenyl; nile red; rhodamine 700; oxazine 750; rhodamine 800; IR 125; IR 144; IR 140; IR 132; IR 26; IR5; diphenylhexatriene; diphenylbutadiene; tetraphenylbutadiene; naphthalene; anthracene; 9,10-diphenylanthracene; pyrene; chrysene; rubrene; coronene; phenanthrene or the like, 3-hydroxyflavones such as disclosed in US 2009/0054586 A1, or combinations comprising at least one of the foregoing dyes.

The thermoplastic compositions can be manufactured by various methods. For example, powdered polycarbonate, impact modifier, epoxy additive, phenolic diphosphite, and/or other optional components can be first blended in a HENSCHEL-Mixer* high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat and/or downstream through a sidestuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

Shaped, formed, or molded articles comprising the polycarbonate compositions are also provided. The polycarbonate compositions can be molded into useful shaped articles by a variety of means such as injection molding, extrusion, rotational molding, blow molding and thermoforming to form articles. The articles can be configured for virtually any application such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. Additionally, the beneficial optical properties of the thermoplastic composition help contribute to its suitability for applications such illuminant lens (e.g., a collimator lens), illuminant cover, a light guide (also known as an optical waveguide) (e.g., an optical fiber), an optical sheet (e.g., a transparent sheet, a display film, and so forth). The illuminating device which comprises the light-transmitting article can be any device that is lighted, such as a toy an illuminant article of furniture (e.g., a lighted table, lighted chair, bar, etc. with light illuminating features therein), art object, a light (e.g., a lamp (e.g. motor vehicle headlamp, house lamp, security lamp, and so forth)) and so forth.

In some embodiments, the article is a light guide or light transmitting device. Light guides utilize refractive index differentials between the polycarbonate composition and the surrounding environment (e.g., air) to maintain a condition where light propagating through the polycarbonate is internally reflected at the polycarbonate/air interface. The light guide or light transmitting device can have a light transmission paths of various distances, such as at least 3 mm, at least 5 mm, at least 10 mm, or at least 20 mm. In some embodiments, the article is configured to have a viewing surface and a thickness of at least 0.5 cm as measured perpendicular to the viewing surface. In some embodiments, the article is a sheet configured to have a viewable edge surface.

The thermoplastic compositions are further illustrated by the following non-limiting examples.

EXAMPLES

The following components are used in the examples. PC1 was prepared using a bisphenol having sulfur content less than 2 ppm by weight and less than 150 ppm hydroxyl content, according to US2013/0035441A1 and US2013/0108820 A1. Unless specifically indicated otherwise, the amount of each component is in weight percent in the following examples, based on the total weight of the composition.

TABLE 1

| Acronym | Component | Source |
|---|---|---|
| PC1 | BPA polycarbonate, MW about 30,000, CAS: 25971-63-5 | SABIC |
| PC2 | BPA polycarbonate, MW about 30,000 CAS: 25971-63-5 | SABIC |
| I-168 | Irgaphos* 168, tris(2,4-di-t-butylphenyl) phosphite CAS: 31570-04-4 | CIBA |
| D S-9228 | Doverphos* S-9228, bis(2,4-dicumyl) pentaerythritol diphosphite CAS: 154862-43-8 | Dover Chemical |
| PEP 36 | ADK stab PEP 36, Bis(tri-alkylated phenyl)-PEDP CAS: 80693-00-1 | ADEKA PALMAROLE |
| TPP | Triphenylphosphine CAS: 603-35-0 | BASF |
| A 1076 | Antioxidant 1076, Octadecyl 3-(3,5-di-tert-butyl-4-hydroxyphenyl)propionate, CAS: 2082-79-3 | CHEMTURA |
| CA Epoxy | Cycloaliphatic Epoxy Resin, 3,4-epoxycyclohexylmethyl-3,4-epoxycyclohexyl carboxylate CAS: 2386-87-0 | IMCDgroup |
| Epoxydized SB oil | Epoxidized Soyabean Oil CAS: 8013-07-8 | Sigma Aldrich |
| DER 671 Epoxy | DER 671 Epoxy Resin, Bisphenol A-(epichlorohydrin); epoxy resin (avg: MW 700-1100) CAS: 25068-38-6 | Hexion Specialty Chemicals |

All thermoplastic compositions except where indicated are compounded on an intermeshing co-rotating twin-screw extruder to form pellets of the composition, using a temperature of 280° C. to 300° C. and a heating residence time of about 30 seconds. The compositions are subsequently molded using an ENGEL 75T injection molder with AXXICON insert mold system to mold 60 mm×60 mm×2.5 mm color test plaques at standard molding conditions with a temperature of about 290° C. and a residence time about 5 minutes.

The plaques are first measured for color on a Macbeth 7000A spectrophotometer in transmission mode and UV excluded. CIELAB 1976 color values (L*, a*, b*) (ISO 11664-4:2008(E)/CIE S 014-4/E:2007 are determined from the absorption spectrum of a 2.5 mm thick color plaque between 400 nm and 700 nm. Yellowness index (YI) values can be calculated according to ASTM D1925-E313. The plaques can also be measured for transmission and haze according to ASTM D1003-00 using a BYK Gardner Haze-gard dual. After initial color measurements, the plaques are subjected to aging in a circulating air oven at 130° C. for up to 2000 hours. Periodically (after aging for 50 hours, 250 hours, 500 hours, 750 hours, 1000 hours, and 2000 hours), the samples are removed from the oven, measured for color as described above, and returned to the oven. The change in color after aging, expressed as dE (2000 hrs.).

Examples 1-4 and Comparative Examples 1-10

Plaques were prepared from thermoplastic compositions as set forth in Tables 2, 3 and 4 and subjected to aging with color measurements as described above. CIELAB 1976 L*, a*, and b* values, along with dE (2000 hrs.) values based on a comparison of initial color measurements and color measurements taken after 2000 hours of aging at 130° C., are shown in Tables 2, 3 and 4

TABLE 2

| sample | PC1 (% wt) | PC2 (% wt) | I-168 (% wt) | D S-9228 (% wt) | PEP 36v (% wt) | TPP (% wt) | A 1076 (% wt) | L* | a* | b* | dE (2000 hrs.) |
|---|---|---|---|---|---|---|---|---|---|---|---|
| CE1 | 100 | | | | | | | 95.83 | −0.08 | 0.80 | 1.70 |
| CE2 | | 100 | | | | | | 95.54 | −0.18 | 1.47 | 5.86 |
| CE3 | 99.95 | | 0.05 | | | | | 95.83 | −0.08 | 0.63 | 2.38 |
| CE4 | 99.9 | | 0.1 | | | | | 95.90 | −0.05 | 0.58 | 2.24 |
| CE5 | 99.8 | | 0.2 | | | | | 95.90 | −0.04 | 0.54 | 6.21 |
| CE6 | 99.95 | | | 0.05 | | | | 95.84 | −0.06 | 0.56 | 5.49 |
| CE7 | 99.9 | | | 0.1 | | | | 95.87 | −0.05 | 0.51 | 7.49 |
| CE8 | 99.8 | | | 0.2 | | | | 95.90 | −0.03 | 0.49 | 52.54 |
| CE9 | 99.95 | | | | 0.05 | | | 95.88 | −0.05 | 0.52 | 4.03 |
| CE10 | 99.9 | | | | 0.1 | | | 95.90 | −0.03 | 0.52 | 30.28 |
| CE11 | 99.8 | | | | 0.2 | | | 95.94 | −0.03 | 0.45 | 70.75 |
| CE12 | 99.95 | | | | | 0.05 | | 95.87 | −0.06 | 0.53 | 3.34 |
| CE13 | 99.9 | | | | | 0.1 | | 95.92 | −0.04 | 0.48 | 2.90 |
| CE14 | 99.8 | | | | | 0.2 | | 95.91 | −0.06 | 0.54 | 4.01 |
| CE15 | | 99.9 | 0.1 | | | | | 95.76 | −0.09 | 0.83 | 11.50 |
| CE16 | 99.98 | | | | | | 0.02 | 95.87 | −0.07 | 0.63 | 1.09 |
| CE17 | 99.96 | | | | | | 0.04 | 95.85 | −0.08 | 0.75 | 1.71 |
| CE18 | 99.93 | | 0.05 | | | | 0.02 | 95.85 | −0.06 | 0.57 | 0.99 |
| CE42 | 99.97 | | | 0.01 | | | 0.02 | 95.85 | −0.07 | 0.57 | 1.17 |
| CE19 | 99.93 | | | 0.05 | | | 0.02 | 95.87 | −0.06 | 0.54 | 1.41 |
| CE20 | 99.88 | | | 0.1 | | | 0.02 | 95.90 | −0.05 | 0.49 | 2.46 |
| CE21 | 99.78 | | | 0.2 | | | 0.02 | 95.90 | −0.06 | 0.49 | 24.93 |
| CE22 | 99.93 | | | | 0.05 | | 0.02 | 95.92 | −0.05 | 0.50 | 9.85 |
| CE23 | 99.88 | | | | 0.1 | | 0.02 | 95.92 | −0.05 | 0.49 | 36.54 |
| CE24 | 99.93 | | | | | 0.05 | 0.02 | 95.91 | −0.04 | 0.48 | 4.48 |
| CE25 | 99.88 | | | | | 0.1 | 0.02 | 95.90 | −0.04 | 0.48 | 5.75 |

TABLE 3

| sample | PC1 (% wt) | PC2 (% wt) | I-168 (% wt) | D S-9228 (% wt) | PEP 36 (% wt) | TPP (% wt) | A 1076 (% wt) | CA Epoxy (% wt) | L* | a* | b* | dE (2000 hrs.) |
|---|---|---|---|---|---|---|---|---|---|---|---|---|
| CE26 | 99.9 | | | | | | | 0.1 | 95.81 | −0.08 | 0.80 | 2.59 |
| CE27 | 99.95 | | | | | | | 0.05 | 95.84 | −0.09 | 0.75 | 1.74 |
| CE30 | 99.85 | | 0.1 | | | | | 0.05 | 95.91 | −0.05 | 0.56 | 1.67 |
| CE31 | 99.7 | | 0.2 | | | | | 0.1 | 95.90 | −0.04 | 0.53 | 1.36 |
| EX1 | 99.85 | | | 0.1 | | | | 0.05 | 95.90 | −0.04 | 0.50 | 1.93 |
| EX2 | 99.7 | | | 0.2 | | | | 0.1 | 95.90 | −0.03 | 0.47 | 1.76 |
| EX3 | 99.85 | | | | 0.1 | | | 0.05 | 95.92 | −0.04 | 0.52 | 1.88 |
| CE32 | 99.7 | | | | 0.2 | | | 0.1 | 95.93 | −0.03 | 0.46 | 14.71 |
| CE33 | 99.85 | | | | | 0.1 | | 0.05 | 95.91 | −0.10 | 0.63 | 2.54 |
| CE34 | 99.7 | | | | | 0.2 | | 0.1 | 95.88 | −0.10 | 0.69 | 4.15 |
| CE37 | | 99.85 | | 0.1 | | | | 0.05 | 95.70 | −0.11 | 0.95 | 9.78 |
| CE38 | 99.93 | | | | | | 0.02 | 0.05 | 95.85 | −0.08 | 0.76 | 1.00 |
| CE39 | 99.83 | | 0.1 | | | | 0.02 | 0.05 | 95.91 | −0.05 | 0.57 | 0.78 |
| EX7 | 99.92 | | | 0.01 | | | 0.02 | 0.05 | 95.88 | −0.06 | 0.57 | 0.71 |
| EX6 | 99.88 | | | 0.05 | | | 0.02 | 0.05 | 95.88 | −0.04 | 0.52 | 0.79 |
| EX4 | 99.83 | | | 0.1 | | | 0.02 | 0.05 | 95.90 | −0.05 | 0.50 | 0.84 |
| EX5 | 99.83 | | | | 0.1 | | 0.02 | 0.05 | 95.92 | −0.04 | 0.49 | 1.81 |
| CE40 | 99.83 | | | | | 0.1 | 0.02 | 0.05 | 95.90 | −0.11 | 0.66 | 1.90 |

TABLE 4

| sample | PC1 (% wt) | D S-9228 (% wt) | Epoxydized SB oil (% wt) | DER 671 Epoxy (% wt) | L* | a* | b* | dE76 (2000 hrs.) |
|---|---|---|---|---|---|---|---|---|
| CE28 | 99.95 | | 0.05 | | 95.85 | −0.09 | 0.76 | 1.66 |
| CE29 | 99.95 | | | 0.05 | 95.83 | −0.09 | 0.80 | 1.60 |
| CE35 | 99.85 | 0.1 | 0.05 | | 95.87 | −0.05 | 0.61 | 2.33 |
| CE36 | 99.85 | 0.1 | | 0.05 | 95.89 | −0.05 | 0.55 | 2.22 |

As shown in Table 2, phosphite stabilizers as well as triphenylphospine (CE3 to CE14) give better starting color (lower b*) after processing compared to polycarbonate without stabilizers (CE1). Pentaerithrol based phosphites are more effective in reducing color than the other stabilizers. All these P-containing stabilizers lead to worse color stability (higher delta E). This effect is again the strongest for pentaerithrol based phosphites. Table 2 also shows that PC1 leads to lower color and improved color stability than PC2. Table 2 also shows that for many polycarbonate compositions, such as those having a free hydroxy content of greater than 150 ppm and/or prepared from a bisphenol having a sulfur content of greater than 2 ppm by weight, the epoxy additive can actually increase the yellowness of molded articles. See, e.g., a comparison of CE15 and CE37 in Tables 2 and 3.

The addition of Antioxidant 1076 has a positive effect on color stability, as shown by examples CE16 to CE25, but in combination with higher levels of pentaerithrol based stabilizers, discoloration remains higher than the target value of 2.0. In combination with another phosphite stabilizer such as I-168, color stability is good, but initial color is too yellow (CE16, CE17) b*>0.56.

Figure 1:
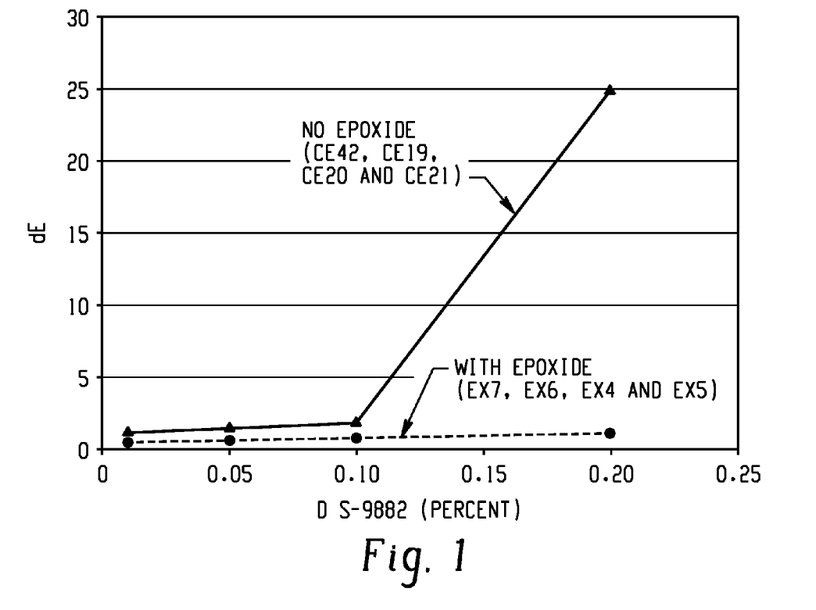
FIGS. 1 and 2 are plots of dE (2000 hrs.) values for test plaques of a thermoplastic composition described herein.
Figure 2:
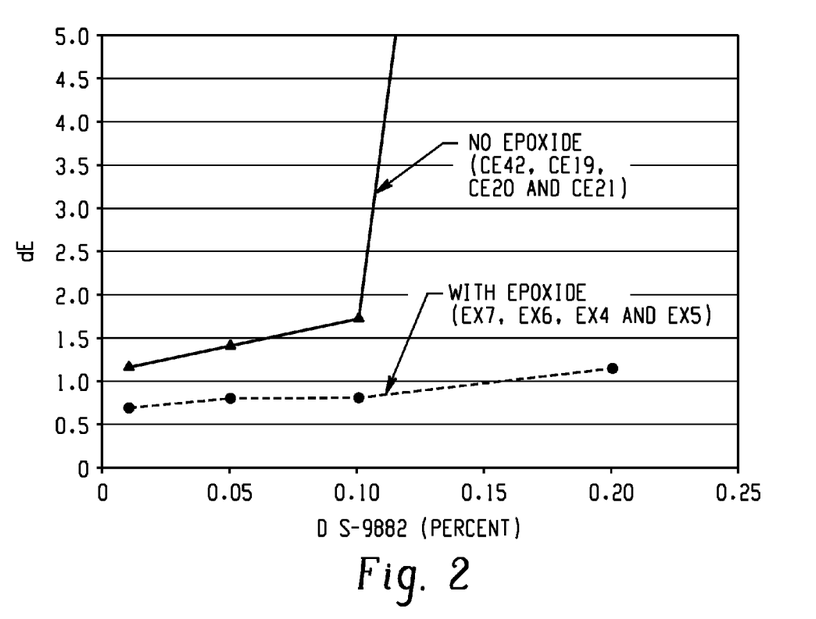

The use of epoxide typically does not lead to improved color stability as shown by the samples in Tables 2 and 3. Comparing CE26 and CE27 with CE1, it is shown that higher levels of epoxy reduce color stability. Surprisingly however, it was found that the epoxide can improve color stability when it is used in combination with phosphites, in particular those based on pentaerithrol such as Doverphos S-9228 and ADK STB PEP-36. This is illustrated by comparing EX1 and EX2 with CE7 and CE8, comparing EX3 and CE32 with CE10 and CE11 and by comparing EX4 and EX5 with CE20 and CE23. The comparison is shown graphically in FIGS. 3 and 4, which plot dE as a function of the D S-9882 phosphite for compositions with and without epoxide. The plots show a sharp increase in dE (2000 hrs.) when Doverphos level exceeds 0.1 wt. % for the composition without an epoxide, but stable dE (2000 hrs.) at Doverphos levels over 0.1 wt. % for the composition with the epoxide additive.

Table 4 shows that not all epoxy containing materials are effective. Epoxydized soybean oil and DER 671 epoxy do not result in color stability improvement.

Set forth below are some embodiments of the illuminating device and methods of making and using the same.

Embodiment 1

A plastic article formed from a thermoplastic composition comprising a polycarbonate having repeating structural carbonate units according to the formula $$-R^1-O-\overset{\overset{O}{\|}}{C}-O- \quad (1)$$

in which at least 60 percent of the total number of $R^1$ groups contain aromatic moieties and the balance thereof are aliphatic, alicyclic, or aromatic; the polycarbonate having been prepared through an interfacial polymerization process from BPA monomer having an organic purity higher than 99.70% by weight and having a hydroxyl content lower than 150 ppm by weight; 0.01 wt. % to 0.30 wt. %, based on the total weight of the thermoplastic composition, of an epoxy additive having at least two epoxy groups per molecule; and 0.01 wt. % to 0.30 wt. %, based on the total weight of the thermoplastic composition, of a phenolic diphosphite derived from pentaerythritol; wherein the thermoplastic composition has a sulfur content lower than 2 ppm, and wherein the thermoplastic composition exhibits a dE (2000 hrs.) value of less than 2.0 after 2000 hours of heat aging at 130° C., measured according

Embodiment 2

The plastic article of Embodiment 1, wherein the thermoplastic composition exhibits a dE76 value of less than 1.50 after 2000 hours of heat aging at 130° C., measured according ISO 11664-4:2008(E)/CIE S 014-4/E:2007 using CIE illuminant D65 and a 2.5 mm thick molded plaque of the thermoplastic composition.

Embodiment 3

The plastic article of Embodiment 2, wherein the thermoplastic composition exhibits a dE76 value of less than 0.95 after 2000 hours of heat aging at 130° C., measured according to ISO 11664-4:2008(E)/CIE S 014-4/E:2007 using CIE illuminant D65 and a 2.5 mm thick molded plaque of the thermoplastic composition.

Embodiment 4

The plastic article of any of Embodiments 1-3, wherein the thermoplastic composition exhibits a $b^*<0.56$ and a $L^*>95.85$ as specified by ISO 11664-4:2008(E)/CIE S 014-4/E:2007 using CIE illuminant D65 and a 2.5 mm thick molded plaque of the thermoplastic composition.

Embodiment 5

The plastic article of Embodiment 4, wherein the thermoplastic composition exhibits a $b^*<0.56$ and a $L^*>95.65$ as specified by ISO 11664-4:2008(E)/CIE S 014-4/E:2007, measured according ISO 11664-4:2008(E)/CIE S 014-4/E: using CIE illuminant D65 and a 2.5 mm thick molded plaque of the thermoplastic composition.

Embodiment 6

The plastic article of Embodiment 5, wherein the thermoplastic composition exhibits a $b^*$ of $<0.54$ and a $L^*>95.75$ as specified by ISO 11664-4:2008(E)/CIE S 014-4/E:2007, measured according ISO 11664-4:2008(E)/CIE S 014-4/E:2007 using CIE illuminant D65 and a 2.5 mm thick molded plaque of the thermoplastic composition.

Embodiment 7

The plastic article of any of Embodiments 1-3, wherein the thermoplastic composition exhibits a $b^*$ of $<0.52$ and a $L^*>98.85$ as specified by ISO 11664-4:2008(E)/CIE S 014-4/E:2007, measured according ISO 11664-4:2008(E)/CIE S 014-4/E:2007 using CIE illuminant D65 and a 2.5 mm thick molded plaque of the thermoplastic composition.

Embodiment 8

The plastic article of any of Embodiments 1-7, wherein the epoxy additive is an aliphatic epoxide having at least two epoxy groups per molecule and a molecular weight less than 600 g/mol.

Embodiment 9

The plastic article of Embodiment 8, wherein the epoxy additive is a carboxylate epoxy resin.

Embodiment 10

The plastic article of Embodiment 9, wherein the epoxy additive is a carboxylate epoxy resin comprising a carboxylate diepoxide according to the formula:

Embodiment 11

The plastic article of any of Embodiments 1-10, wherein the phenolic diphosphite is according to the formula:

wherein $R_1$, $R_2$, $R_3$, $R_4$, $R_5$, $R_6$, $R_7$, $R_8$, $R_9$, and $R_{10}$ each independently represents hydrogen or a $C_{1-20}$ organic radical.

Embodiment 12

The plastic article of Embodiment 11, wherein $R_2$, $R_5$, $R_5$, $R_7$, $R_9$, and $R_{10}$ are H and $R_1$, $R_2$, $R_6$, and $R_8$ each independently represents a $C_{1-20}$ organic radical.

Embodiment 13

The plastic article of Embodiment 12, wherein $R_1$, $R_3$, $R_6$, and $R_8$ each independently represents an alkaryl radical of 4 to 13 carbon atoms.

Embodiment 14

The plastic article of Embodiment 13, wherein $R_1$, $R_3$, $R_6$, and $R_8$ are each cumyl.

Embodiment 15

The plastic article of Embodiment 11 wherein at least 40% of the $R_1$, $R_2$, $R_3$, $R_4$, $R_5$, $R_6$, $R_7$, $R_8$, $R_9$, and $R_{10}$ groups are cumyl.

Embodiment 16

The plastic article of any of Embodiments 1-15, wherein at least 90% of the $R^1$ groups are derived from a bisphenol.

Embodiment 17

The plastic article of Embodiment 15, wherein all of the $R^1$ groups are derived from a bisphenol.

Embodiment 18

The plastic article of Embodiments 15 or 16, wherein the bisphenol is bisphenol A.

Embodiment 19

The plastic article of any of Embodiments 16-18, wherein the bisphenol comprises from 0.5 ppm to 2 ppm by weight of sulfur.

Embodiment 20

The plastic article of any of Embodiments 16-19, wherein the bisphenol comprises less than 0.5 ppm by weight of sulfur.

Embodiment 21

The plastic article of any of Embodiments 1-20, wherein the thermoplastic composition comprises from 0.01 wt. % to 0.25 wt. % of the epoxy additive.

Embodiment 22

The plastic article of Embodiment 21, wherein the thermoplastic composition comprises from 0.02 wt. % to 0.10 wt. % of the epoxy additive.

Embodiment 23

The plastic article of any of Embodiments 1-22, wherein the thermoplastic composition comprises from 0.02 wt. % to 0.30 wt. % of the phenolic diphosphite.

Embodiment 24

The plastic article of Embodiment 23, wherein the thermoplastic composition comprises from 0.05 wt. % to 0.20 wt. % of the phenolic diphosphite.

Embodiment 25

The plastic article of any of Embodiments 1-24, wherein the light-transmitting article is an illuminant lens, illuminant cover, a light guide, or an optical sheet.

Embodiment 26

The plastic article of Embodiment 25 that is an illuminant lens or cover.

Embodiment 27

The plastic article of Embodiment 26, wherein the illuminant is a light emitting diode.

Embodiment 28

The plastic article of any of Embodiments 1-27 that is configured to have a viewing surface and a thickness of at least 0.5 cm as measured perpendicular to the viewing surface.

Embodiment 29

The plastic article of any of Embodiments 1-24 that is a light guide or light transmitting device having a light transmission path of at least 3 mm.

Embodiment 30

The plastic article of Embodiment 29, wherein the light transmission path is at least 5 mm.

Embodiment 31

The plastic article of Embodiment 29, wherein the light transmission path is at least 10 mm.

Embodiment 32

The plastic article of Embodiment 29, wherein the light transmission path is at least 20 mm.

Embodiment 33

The plastic article of any of Embodiments 1-24 that is a sheet configured to have a viewable edge surface.

Embodiment 34

The plastic article of any of Embodiments 1-33, wherein the sulfur content is greater than 0 to less than 2 ppm.

Embodiment 35

The plastic article of Embodiment 34, wherein the sulfur content is 0.5 ppm to 2 ppm.

Embodiment 36

The plastic article of Embodiment 34, wherein the sulfur content is less than 0.5 ppm.

Embodiment 37

An agent for making the plastic article with a desired dE value such that a 2.5 mm thick molded plaque of the Agent exhibits a dE (2000 hrs.) value of less than 2.0 after 2000 hours of heat aging at 130° C., measured according ISO 11664-4:2008(E)/CIE S 014-4/E:2007 using CIE illuminant D65, comprising: a thermoplastic composition comprising a polycarbonate having repeating structural carbonate units according to the formula (1)

in which at least 60 percent of the total number of $R^1$ groups contain aromatic moieties and the balance thereof are aliphatic, alicyclic, or aromatic; the polycarbonate having been prepared through an interfacial polymerization process from BPA monomer having an organic purity higher than 99.70% by weight and having a hydroxyl content lower than 150 ppm by weight; 0.01 wt. % to 0.30 wt. %, based on the total weight of the thermoplastic composition, of an epoxy additive having at least two epoxy groups per molecule; and 0.01 wt. % to 0.30 wt. %, based on the total weight of the thermoplastic composition, of a phenolic diphosphite derived from pentaerythritol; wherein the thermoplastic composition has a sulfur content lower than 2 ppm.

Embodiment 38

The agent of Embodiment 37, wherein the sulfur content is greater than 0 to less than 2 ppm.

Embodiment 39

The agent of Embodiment 38, wherein the sulfur content is 0.5 ppm to 2 ppm, or is less than 0.5 ppm.

The singular forms "a," "an," and "the" include plural referents unless the context clearly dictates otherwise. "Or" means "and/or." The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The terms "front", "back", "bottom", and/or "top" are used herein, unless otherwise noted, merely for convenience of description, and are not limited to any one position or spatial orientation. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). The suffix "(s)" is intended to include both the singular and the plural of the term that it modifies, thereby including at least one of that term (e.g., 'the colorant(s)' includes a single colorant or two or more colorants, i.e., at least one colorant). "Optional" or "optionally" means that the subsequently described event or circumstance can or cannot occur, and that the description includes instances where the event occurs and instances where it does not. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a C2-6 alkanoyl group such as acyl); carboxamido; C1-6 or C1-3 alkyl, cycloalkyl, alkenyl, and alkynyl (including groups having at least one unsaturated linkages and from 2 to 8, or 2 to 6 carbon atoms); C1-6 or C1-3 alkoxy groups; C6-10 aryloxy such as phenoxy; C1-6 alkylthio; C1-6 or C1-3 alkylsulfinyl; C1-6 or C1-3 alkylsulfonyl; aminodi(C1-6 or C1-3)alkyl; C6-12 aryl having at least one aromatic rings (e.g., phenyl, biphenyl, naphthyl, or the like, each ring either substituted or unsubstituted aromatic); C7-19 alkylenearyl having 1 to 3 separate or fused rings and from 6 to 18 ring carbon atoms, with benzyl being an exemplary arylalkyl group; or arylalkoxy having 1 to 3 separate or fused rings and from 6 to 18 ring carbon atoms, with benzyloxy being an exemplary arylalkoxy group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:
1. A plastic article formed from a thermoplastic composition comprising a polycarbonate having repeating structural carbonate units according to the formula

(1)

in which at least 60 percent of the total number of R$^1$ groups contain aromatic moieties and the balance thereof are aliphatic, alicyclic, or aromatic; the polycarbonate having been prepared through an interfacial polymerization process from BPA monomer having an organic purity higher than 99.70% by weight and having a hydroxyl content lower than 150 ppm by weight;

wt. % to 0.30 wt. %, based on the total weight of the thermoplastic composition, of an epoxy additive having at least two epoxy groups per molecule; and wt. % to 0.30 wt. %, based on the total weight of the thermoplastic composition, of a phenolic diphosphite derived from pentaerythritol;

wherein the thermoplastic composition has a sulfur content lower than 2 ppm, and wherein the thermoplastic composition exhibits a dE (2000 hrs.) value of less than 2.0 after 2000 hours of heat aging at 130° C., measured according ISO 11664-4:2008(E)/CIE S 014-4/E:2007 using CIE illuminant D65 and a 2.5 mm thick molded plaque of the thermoplastic composition.

2. The plastic article of claim 1, wherein the thermoplastic composition exhibits a dE76 value of less than 1.50 after 2000 hours of heat aging at 130° C., measured according ISO 11664-4:2008(E)/CIE S 014-4/E:2007 using CIE illuminant D65 and a 2.5 mm thick molded plaque of the thermoplastic composition.

3. The plastic article of claim 1, wherein the thermoplastic composition exhibits a b*<0.56 and a L*>95.85 as specified by ISO 11664-4:2008(E)/CIE S 014-4/E:2007 using CIE illuminant D65 and a 2.5 mm thick molded plaque of the thermoplastic composition.

4. The plastic article of claim 1, wherein the thermoplastic composition exhibits a b* of <0.52 and a L*>98.85 as specified by ISO 11664-4:2008(E)/CIE S 014-4/E:2007, measured according ISO 11664-4:2008(E)/CIE S 014-4/E:2007 using CIE illuminant D65 and a 2.5 mm thick molded plaque of the thermoplastic composition.

5. The plastic article of claim 1, wherein the epoxy additive is an aliphatic epoxide having at least two epoxy groups per molecule and a molecular weight less than 600 g/mol.

6. The plastic article of claim 5, wherein the epoxy additive is a carboxylate epoxy resin.

7. The plastic article of claim 6, wherein the epoxy additive is a carboxylate epoxy resin comprising a carboxylate diepoxide according to the formula:

8. The plastic article of claim 1, wherein the phenolic diphosphite is according to the formula:

wherein $R_1$, $R_2$, $R_3$, $R_4$, $R_5$, $R_6$, $R_7$, $R_8$, $R_9$, and $R_{10}$ each independently represents hydrogen or a $C_{1-20}$ organic radical.

9. The plastic article of claim 8, wherein $R_1$, $R_3$, $R_6$, and $R_8$ are each cumyl.

10. The plastic article of claim 8, wherein at least 40% of the $R_1$, $R_2$, $R_3$, $R_4$, $R_5$, $R_6$, $R_7$, $R_8$, $R_9$, and $R_{10}$ groups are cumyl.

11. The plastic article of claim 1, wherein at least 90% of the $R^1$ groups are derived from a bisphenol.

12. The plastic article of claim 10, wherein all of the $R^1$ groups are derived from a bisphenol.

13. The plastic article of claim 10, wherein the bisphenol is bisphenol A.

14. The plastic article of claim 1, wherein the thermoplastic composition comprises from 0.01 wt. % to 0.25 wt. % of the epoxy additive.

15. The plastic article of claim 1, wherein the thermoplastic composition comprises from 0.02 wt. % to 0.30 wt. % of the phenolic diphosphite.

16. The plastic article of claim 1, wherein the light-transmitting article is an illuminant lens, illuminant cover, a light guide, or an optical sheet.

17. The plastic article of claim 16, that is an illuminant lens or cover.

18. The plastic article of claim 17, wherein the illuminant is a light emitting diode.

19. The plastic article of claim 1, that is configured to have a viewing surface and a thickness of at least 0.5 cm as measured perpendicular to the viewing surface.

20. The plastic article of claim 1, that is a light guide or light transmitting device having a light transmission path of at least 3 mm.

21. The plastic article of claim 20, wherein the light transmission path is at least 10 mm.

22. The plastic article of claim 1, that is a sheet configured to have a viewable edge surface.

\* \* \* \* \*